United States Patent [19]

Mouton

[11] Patent Number: 4,805,873
[45] Date of Patent: Feb. 21, 1989

[54] CONTROL DEVICE FOR A STARTER VALVE OF A TURBINE AERO-ENGINE

[75] Inventor: Pierre C. Mouton, Grigny, France

[73] Assignee: Societe Nationale D'Etude et de Construction De Moteurs D'Aviation "S.N.E.C.M.A.", Paris, France

[21] Appl. No.: 122,683

[22] Filed: Nov. 18, 1987

[30] Foreign Application Priority Data

Nov. 20, 1986 [FR] France .................. 86 16137

[51] Int. Cl.⁴ ........................... F16K 31/363
[52] U.S. Cl. .......................... 251/31; 92/30; 251/30.05; 251/58; 251/64
[58] Field of Search ........... 251/30.05, 31, 58, 64; 92/30

[56] References Cited

U.S. PATENT DOCUMENTS 2,873,577  5/1955  Kenney et al. .
3,452,961  7/1969  Forsman ..................... 251/58 X
4,412,671  11/1983 Tiefenthaler ................. 92/30 X

FOREIGN PATENT DOCUMENTS 3600244  9/1986  Fed. Rep. of Germany .
797025   6/1958  United Kingdom .
2172093  9/1986  United Kingdom .

Primary Examiner—Robert G. Nilson
Attorney, Agent, or Firm—Oblon, Fisher, Spivak, McClelland & Maier

[57] ABSTRACT

The spindle of a butterfly valve for controlling the supply of compressed air to the starter of a turbine aero-engine is rotated to open and close the valve by the linear movement of a slide in a cylinder in response to the pressure differential between a pair of chambers defined by the slide and the cylinder. A resilient mechanism is provided for holding the slide when the valve is closed and temporarily preventing movement of the slide to open the valve until a predetermined minimum pressure difference exists between the two chambers. The slide is then released and travels initially at high speed and then at a speed limited by a throttle venting the lower pressure chamber to atmosphere. This makes it possible to create a relatively high rate of increase in the pressure of air supplied to the starter at the commencement of opening of the butterfly valve while controlling the final rate of pressure rise. The device can thus be used equally with an inertia starter or a free wheel starter.

5 Claims, 3 Drawing Sheets

CONTROL DEVICE FOR A STARTER VALVE OF A TURBINE AERO-ENGINE

BACKGROUND OF THE INVENTION

1. Field of the Invention

The present invention relates to means for controlling the starters of turbine plants.

2. Discussion of the Background

Air-operated starters of turbine plants, particularly turbojet engines, comprise a turbine driven by an auxiliary compressed air generator, a reduction gear and a clutch system. The clutch system may take one of two forms, being either of the "free wheel" type (toothed wheel and detent), or of the "inertia launcher" type (claws or dog-teeth), and in each case the starter is operated by opening a butterfly valve in the compressed air supply duct to feed the starter turbine.

However, according to the type of clutch used in the starter, the characteristics required for the opening of the starter valve are conflicting. The free wheel system requires acceleration of the starter to remain within specific limits when the starter valve is opened, in order to minimize impact on the clutch, particularly when the engine is already turning over (auto rotation). On the other hand, the inertia system requires an acceleration rate greater than a certain minimum value in order positively to engage the claw-engagement system between the starter and the engine.

Now, as starters are manufactured by different equipment manufacturers and may be mounted equally on a particular engine according to the customer's choice, it would be advantageous for the engine manufacturers to provide starter valve systems capable of being used with both the above-mentioned types of starter.

However, conventional starter valve systems are quite inadequate to deal with the essential, but contrasting, conditions mentioned earlier, and make it difficult to use a system which is common to both types of starter.

Indeed, conventional starter valve systems employ an effective restriction in a supply to or discharge from an actuator controlling the butterfly valve. As a result, during the first few degrees of opening, the slight gain in "cross-section/angle of opening" of the butterfly valve means that the rate of pressure increase at the inlet to the starter turbine remains low, leading to poor acceleration of the starter. If this working restriction is eliminated so as to permit satisfactory functioning of inertia launcher starters, the effect on a free wheel starter would be to exceed the impact capacity of the clutch due to the excessive acceleration which it would induce in the reduction gear in the case of auto-rotation.

It must also be noted that these contrasting characteristics are aggravated by the fact that the supply pressure from the auxiliary compressed air generator upstream of the starter valve may vary within a ratio of 3:1, as shown in FIG. 2 which reproduces the characteristic curves of supply pressure increase as a function of time with respect to conventional starter valve systems.

SUMMARY OF THE INVENTION

The primary object of the present invention is to provide a starter valve system which is capable of being used with both the aforesaid types of starter and which, in order to achieve this, makes it possible to limit the acceleration obtained at high pressure while providing, in the first few degrees of opening of the butterfly valve, a sufficient acceleration even at low pressure.

To this end, according to the invention there is provided a control device for a butterfly valve for controlling the supply of compressed air to the starter of a turbine aero-engine, said device comprising a cylinder, an operator slide mounted for linear movement in said cylinder, first and second chambers defined by said cylinder and said operator slide whereby said slide is movable under the action of a pressure differential between said first and second chambers, a spindle on which said butterfly valve is mounted and which is operatively connected to said operator slide whereby said linear movement of said slide causes rotation of said spindle to open and close said valve, retaining means for holding said operator slide when said valve is closed and temporarily preventing movement of said slide to open said valve in response to creation of a negative pressure in said first chamber relative to said second chamber until a predetermined minimum pressure differential is reached, whereupon said slide travels at high speed in said cylinder to recompress said first chamber, and means for limiting the subsequent speed of travel of said operator slide when recompression of said first chamber has taken place.

Preferably the operator slide comprises a first piston of relatively large cross-sectional area at one end of said slide, and a second piston of smaller area at the opposite end of said slide, said first piston defining with the corresponding end of said cylinder an operating chamber forming said first chamber, and said second piston defining with said first piston and said cylinder a central chamber forming said second chamber, and said device includes means for communicating said second chamber with said compressed air upstream of said butterfly valve, and valve means for communicating said first chamber either with said second chamber or with atmospheric pressure in order to depressurize said first chamber. Preferably the valve means is electrically operated.

In one construction in accordance with the invention the retaining means comprises a resilient element carried by a fixed support of the cylinder, and an external rod rigid with the slide, the rod comprising a protuberance having two frustoconical portions co-operating with the resilient element when the butterfly valve is closed.

In an alternative construction in accordance with the invention, the retaining device may comprise a magnet arranged to co-operate with a metal part of the slide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
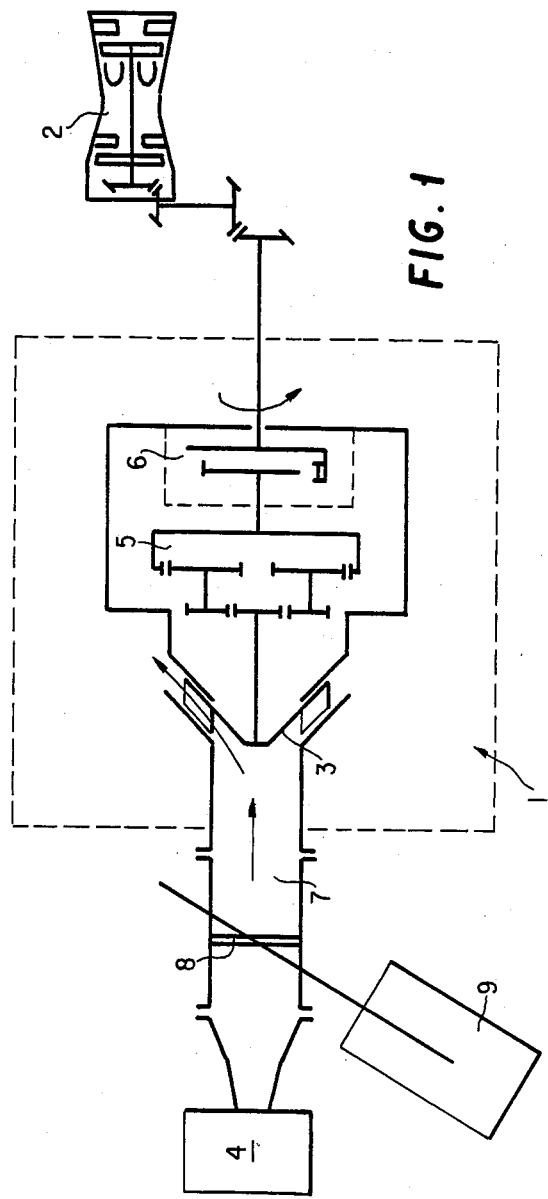
FIG. 1 is a diagrammatic view of a starter of a turbine plant, and of its operating circuit.
Figure 1A:
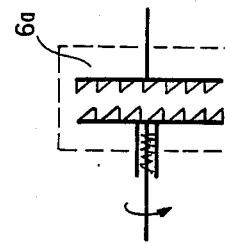
FIG. 1A shows an inertia wheel with dog teeth.

With reference to FIG. 1, the starter 1 of a turbine plant 2 comprises a turbine 3 driven by air delivered either from a compressed air generator 4 or from some other turbine plant which is already operating. The turbine 3 drives an epicyclic reduction gear 5, the output shaft of which is linked to a clutch 6 which may be a free wheel device with a toothed wheel and detent as shown, or an inertia wheel with dog teeth 6a as shown in the alternative partial view shown in FIG. 1A. Pressurization of the duct 7 carrying air to the turbine 3 is controlled by a butterfly valve 8, the rotation of which is effected by a control device 9. In the present state of the art, different valve control devices 9 are used according to the type of starter: a rapid opening type for an inertia clutch starter, and a slowly opening type for a free wheel clutch starter.

Figure 2:
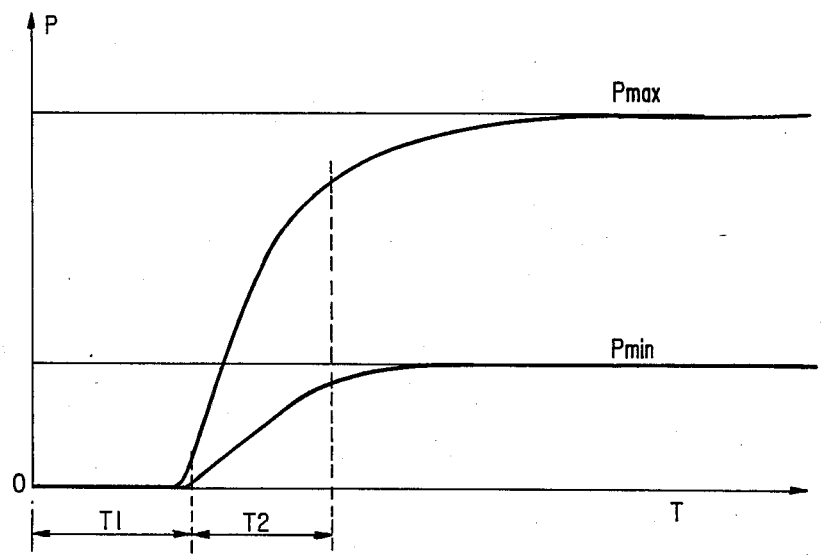
FIG. 2 is a graph showing the maximum and minimum supply pressure curves, as a function of rime, for a starter controlled in a conventional manner.

The latter type gives a pressure rise curve like that shown in FIG. 2. At the outset, the feed pressure to the starter increases slowly for a period T1 and then more rapidly during T2, finally slowing and tending towards a constant maximum value. Furthermore, according to the source of the air supplied to the duct 7, so the maximum feed pressure to the starter may vary within a ratio of about 3:1, and the rates of pressure rise will vary within the same proportions.

Figure 3:
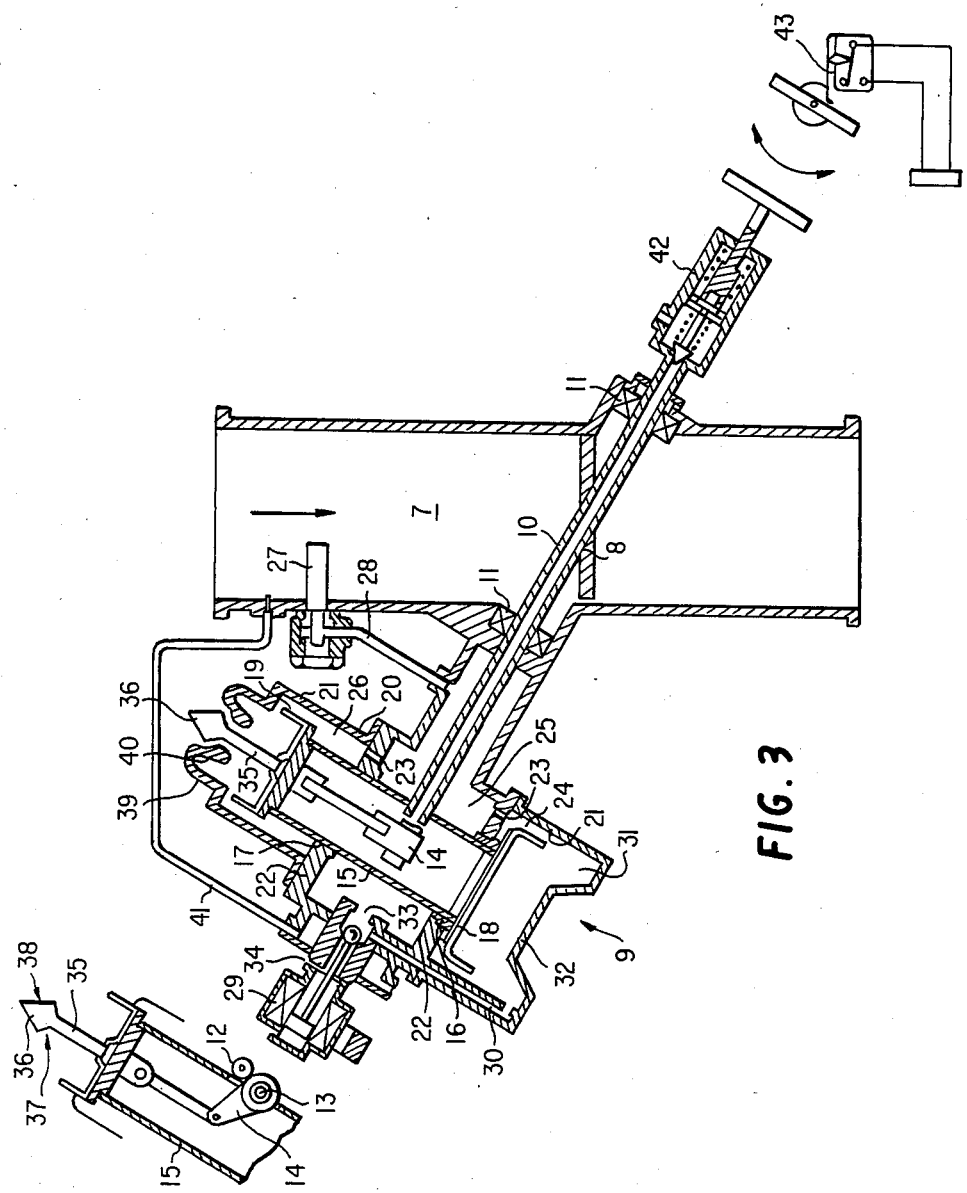
FIG. 3 is a longitudinal sectional view of one example of a control device in accordance with the invention.

The invention concerns the control device 9 and one embodiment is illustrated in FIG. 3. The butterfly valve 8 is mounted on a tubular spindle 10 which is rotatably mounted in roller bearings 11. At one end the spindle carries a toothed wheel 12 meshing with a gear system 13 carried by a connecting rod 14 which is caused to rotate upon linear movement of a slide 15 moving in two guide bores 16,17 in two supporting partitions 22.

The slide 15 comprises two pistons 18 and 19, one at each end, the first piston 18 being of larger cross-sectional area than the second piston 19. The two pistons slide in the casing of the device 9, which forms a cylinder 20, and are sealed in a fluid-tight manner with respect to the cylinder by flexible diaphragms 21 of the "glove finger" type.

Provided in the two partitions 22 are orifices 23 so that the chamber 24 defined between the first piston 18 and one of the partitions 22, and the chamber 26 defined between the other partition 22 and the second piston 19, both communicate with a central chamber 25 defined between the two partitions.

The central chamber 25, and therefore also the chambers 24 and 26, are pressurized by air drawn from the duct 7 upstream of the valve 8 by a scoop 27 and a connecting pipe 28 containing a throttle restriction.

A two-position electrically operated valve 29, when in a first position (i.e. that shown in FIG. 3) allows communication between the central chamber 25 and an operating chamber 31 formed between the first piston 18 and the bottom 32 of the cylinder via a passage 30. In the second position of the electrically operated valve 29, the opening 33 of the chamber 25 to the passage 30 is closed, and the chamber 31 is communicated with atmospheric pressure via the passage 30 and an opening 34 of restricted cross-section. A pipe 41 for drawing air from the duct 7 is shown but its function, which is that of reheating the stem of the electrically operated valve 29, does not in any way affect the invention.

The second piston 19 carries on its outer face a rod 35 comprising a protuberance 36 in the form of a double frustoconical portion 37,38 which co-operates with a resilient element formed by a diaphragm 39 carried by the cylinder 20, the diaphragm 39 having an inner annular lip 40 which surrounds the protuberance 36.

In an alternative embodiment, the circular diaphragm 39 (and its lip 40) may be replaced by an assembly of curved resilient metallic blades evenly distributed around the cylinder 20. In yet another embodiment, the flexible retaining device 36,39,40 may be replaced by a magnet which is rigid with the cylinder 20 and which co-operates with a metal part of the second piston 19.

In operation, when the butterfly valve 8 is in the closed position, the slide 15 is in the position shown in FIG. 3, with the protuberance 36 being securely held by the lip 40 of the retaining diaphragm 39.

The central chamber 25 is pressurized by means of the air which is drawn from the duct 7 via the scoop 27 and pipe 28 and which is supplied by the auxiliary generator 4. While the electrically operated valve 29 is in the position shown in FIG. 3, the opening 33 is open and the operating chamber 31 is pressurized via the passage 30 so that the slide 15 is biassed to the position shown, in which the valve 8 is closed.

Figure 4:
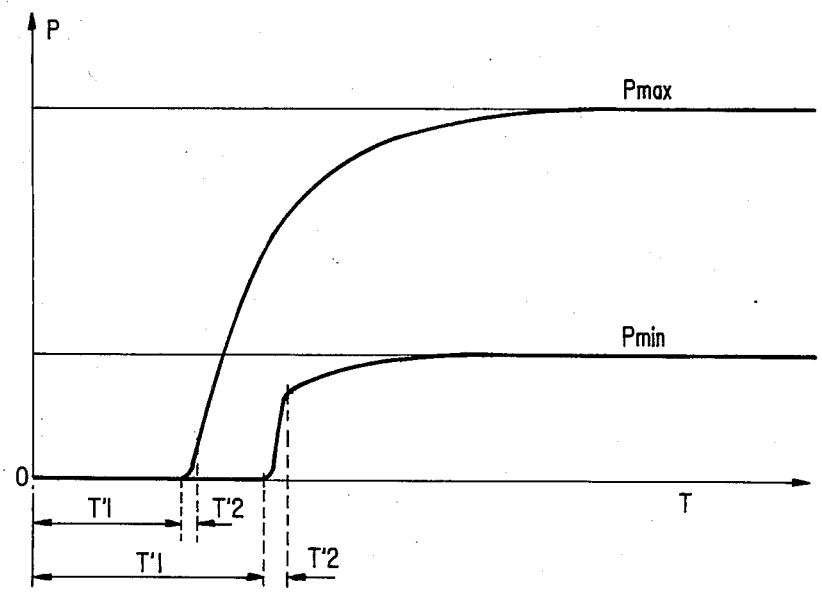
FIG. 4 is a graph similar to that of FIG. 2 but indicating characteristic supply pressure curves as a function of time for a starter having its butterfly valve controlled by a device in accordance with the invention.

To open the butterfly valve 8, it is necessary to move the slide 15, and in order to do this the electrically operated valve 29 is actuated to close the opening 33 and open the communication between the chamber 31 and atmospheric pressure via the passage 30 and the restriction 34. With reference to FIG. 4, the pressure in the chamber 31 diminishes for a period T'1 and the slide tends towards imbalance which ought to bring about commencement of linear movement. However, this cannot occur as long as the force created on the piston 19 by the difference in pressures $\Delta P$ between the chambers 24, 25, 26 and 31 is not greater than the retaining force exerted by the retaining device 36,40. Thus, the slide 15 does not move until the pressure difference reaches a level $\Delta P1$ greater than the level $\Delta Po$ at which displacement of the slide would occur if the retaining device 36,40 were not provided.

When the pressure difference $\Delta P1$ is attained, the retaining device 39,40 releases the protuberance 36 and the slide moves sharply downwards for a period T'2 until such time as recompression of the chamber 31 has taken place. As the chamber 31 is set for air to escape, the slide continues to move but its rate of travel is limited by the rate at which the air is allowed to escape by the restriction 34.

With respect to the butterfly valve 8, the movement of the slide 15 is reflected in a commencement of rapid opening of the valve throughout the period T'2, then a slower opening down to a final position where the maximum supply Pressure to the starter is achieved.

The device as described above makes it possible to create a relatively high rate of increase in pressure upon the initial opening of the butterfly valve 8, suitable for satisfactory functioning of an inertia clutch starter yet still acceptable in the case of a free wheel clutch starter with an engine almost or completely stopped, and also to control the final rate of pressure increase suitably for satisfactory functioning of a free wheel starter with an engine in autorotation. Furthermore, due to the "recompression jump" undergone by the slide, the same rate of increase in pressure at the initial opening is obtained whatever may be the air supply pressure, Pmin or Pmax.

The device may be supplemented by an emergency manual control in the event of the electrically operated valve 29 being inoperative. The emergency control in this embodiment consists of a tap 42 which is disposed ar the opposite end of the spindle 10 from the device 9 and which operates in two stages. Firstly it is pulled to discharge the operating slide of all the compressed air which it contains via the hollow spindle, the air continuously supplied from the scoop 27 being restricted by the throttle formed at the end of the tube 28. Then the tap 42 is turned to rotate the spindle 10 and open the valve 8. A detector 43 as shown in FIG. 3 serves to verify the position of the manually operated tap 42.

The device in accordance with the invention thus makes it possible, very advantageously, to have a single control device with a regulating arrangement which renders the device suitable for use with either of the two types of turbine plant starters mentioned earlier, something which has not been hitherto possible.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for a butterfly valve for controlling the supply of compressed air to the starter of a turbine aero-engine, said device comprising
    a cylinder,
    an operator slide mounted for linear movement in said cylinder,
    first and second chambers defined by said cylinder and said operator slide whereby said slide is movable under the action of a pressure differential between said first and second chambers,
    a spindle on which said butterfly valve is mounted and which is operatively connected to said operator slide whereby said linear movement of said slide causes rotation of said spindle to open and close said valve,
    retaining means for holding said operator slide when said valve is closed and temporarily preventing movement of said slide to open said valve in response to creation of a negative pressure in said first chamber relative to said second chamber until a predetermined minimum pressure differential is reached, whereupon said slide travels at high speed in said cylinder to recompress said first chamber, and
    means for limiting the subsequent speed of travel of said operator slide when recompression of said first chamber has taken place.

2. A control device according to claim 1, wherein said operator slide comprises
    a first piston of relatively large cross-sectional area at one end of said slide, and
    a second piston of smaller area at the opposite end of said slide,
    said first piston defining with the corresponding end of said cylinder an operating chamber forming said first chamber, and
    said second piston defining with said first piston and said cylinder a central chamber forming said second chamber,
    and wherein said device includes
    means for communicating said second chamber with said compressed air upstream of said butterfly valve, and
    valve means for communicating said first chamber either with said second chamber or with atmospheric pressure in order to depressurize said first chamber.

3. A control device according to claim 2, wherein said means for limiting the speed of travel of said slide after irs initial high sped travel comprises a restriction disposed in said communication between said first chamber and atmospheric pressure.

4. A control device according to claim 1, wherein said retaining means comprises a resilient element supported relative to said cylinder, and an external rod rigid with said slide, said rod comprising a protuberance defining two frustoconical portions co-operating with said resilient element when said butterfly valve is closed.

5. A control device according to claim 4, wherein said resilient element comprises a bellows assembly rigidly connected to said cylinder, said bellows defining an inner annular lip which co-operates with one of said two frustoconical portions on said external rod in order to temporarily prevent movement of said slide to open said butterfly valve.

* * * * *

UNITED STATES PATENT AND TRADEMARK OFFICE
CERTIFICATE OF CORRECTION

PATENT NO. : 4,805,873
DATED : FEBRUARY 21, 1989
INVENTOR(S) : PIERRE C. MOUTON

It is certified that error appears in the above-identified patent and that said Letters Patent is hereby corrected as shown below:

```
    In column 2, line 60, change "dog teeth" to --dog-teeth--;
                 line 62, change "rime" to --time--.
    In column 3, line 13, change "dog teeth" to --dog-teeth--;
                 line 57, change "FIG. 3) allows" to --FIG. 3), allows--.
    In column 4, line 13, after "19." insert --The rod 35 and the resilient
retaining device 36,39,40 are subjec to atmospheric pressure.--;
                 line 55, change "Pressure" to --pressure--.
    In column 5, line 5, change "ar" to --at--.
    In column 6, line 29, change "irs" to --its--; also change "sped" to
--speed--.
```

Signed and Sealed this

Fifteenth Day of May, 1990

Attest:

HARRY F. MANBECK, JR.

*Attesting Officer*    *Commissioner of Patents and Trademarks*